US010423795B2

(12) United States Patent
Liu et al.

(10) Patent No.: US 10,423,795 B2
(45) Date of Patent: Sep. 24, 2019

(54) METHOD, CHECKING DEVICE, AND SYSTEM FOR DETERMINING SECURITY OF A PROCESSOR

(71) Applicant: Tsinghua University, Beijing (CN)

(72) Inventors: Leibo Liu, Beijing (CN); Ao Luo, Beijing (CN); Shaojun Wei, Beijing (CN)

(73) Assignee: Tsinghua University, Beijing (CN)

( * ) Notice: Subject to any disclaimer, the term of this patent is extended or adjusted under 35 U.S.C. 154(b) by 197 days.

(21) Appl. No.: 15/804,188

(22) Filed: Nov. 6, 2017

(65) Prior Publication Data

US 2018/0239905 A1 Aug. 23, 2018

(30) Foreign Application Priority Data

Feb. 20, 2017 (CN) .......................... 2017 1 0089783

(51) Int. Cl.
G06F 21/57 (2013.01)
G06F 21/72 (2013.01)
H04L 9/32 (2006.01)

(52) U.S. Cl.
CPC ............ G06F 21/577 (2013.01); G06F 21/57 (2013.01); G06F 21/575 (2013.01); G06F 21/72 (2013.01);
(Continued)

(58) Field of Classification Search
CPC ...... G06F 21/57; G06F 21/577; G06F 21/575; G06F 21/72; G06F 2221/034; H04L 9/3234
See application file for complete search history.

(56) References Cited

U.S. PATENT DOCUMENTS 9,037,895 B2 * 5/2015 Sethumadhavan ..... G06F 21/76
713/502
9,069,938 B2 * 6/2015 Moritz ................ G06F 9/30003
(Continued)

FOREIGN PATENT DOCUMENTS

CN 104239616 12/2014
CN 104866766 8/2015
CN 108345521 7/2018

OTHER PUBLICATIONS

S. Bhunia, M. S. Hsiao, M. Banga and S. Narasimhan, "Hardware Trojan Attacks: Threat Analysis and Countermeasures," IEEE, vol. 102, No. 8, pp. 1229-1247, Aug. 2014, doi: 10.1109/JPROC.2014. 2334493, URL: http://ieeexplore.ieee.org/stamp/stamp.jsp?tp=&arnumber=6856140&isnumber=6860340 (Year: 2014).*

(Continued)

Primary Examiner — Oleg Korsak
Assistant Examiner — Feliciano S Mejia
(74) Attorney, Agent, or Firm — Hamre, Schumann, Mueller & Larson, P.C.

(57) ABSTRACT

The disclosure provides a method, a checking device and a system for determining security of a processor. The method comprises: setting an initial running state of the checking device according to initial running state information of the processor during the target running process, and taking input information of the processor during the target running process as input information of the checking device; causing the checking device to execute a task of the target running process in a manner conforming to predefined behavior to obtain at least one of output information and final running state information of the checking device, wherein the predefined behavior is a standard of hardware behavior of the processor; and determining whether the processor is secure during the target running process according to at least one of the output information and the final running state informa- (Continued)

tion of the checking device when the checking device completes the task of the target running process.

20 Claims, 6 Drawing Sheets

(52) U.S. Cl.
CPC ...... *H04L 9/3234* (2013.01); *G06F 2221/034* (2013.01)

(56) References Cited

U.S. PATENT DOCUMENTS

| | | |
|---|---|---|
| 9,098,700 B2 * | 8/2015 | Sethumadhavan .......................... G06F 9/30145 |
| 2016/0098558 A1 | 4/2016 | Vedula et al. |

OTHER PUBLICATIONS

Second Office Action, issued in the corresponding Chinese patent application No. 201710089783.9, dated Oct. 22, 2018, 24 pages.
Third Office Action, issued in the corresponding Chinese patent application No. 2017100897819, dated Dec. 29, 2018, 10 pages.
Notice on Grant, issued in the corresponding Chinese patent application No. 201710089783.9, dated Feb. 19, 2019, 3 pages.
Chinese Office Action, issued in the corresponding Chinese patent application No. 201710089783.9, dated Aug. 23, 2018, 23 pages.
Hongbo Gao, "Research on Detection Techniques of Instruction-triggered Hardware Trojan Horse", a Dissertation submitted to PLA Information Engineering University for the Degree of Doctor of Engineering, Apr. 2013, 31 pages (English language abstract enclosed).

* cited by examiner

METHOD, CHECKING DEVICE, AND SYSTEM FOR DETERMINING SECURITY OF A PROCESSOR

CROSS-REFERENCE TO RELATED APPLICATION

This application claims priority to Chinese Patent Application No. 201710089783.9, filed with the Chinese Patent Office on Feb. 20, 2017 and entitled "METHOD, CHECKING DEVICE, AND SYSTEM FOR DETERMINING SECURITY OF A PROCESSOR", which is incorporated herein by reference entirely.

TECHNICAL FIELD

The present disclosure relates to the field of computer technology, and more particularly, to a method, a checking device and a system for determining security of a processor.

BACKGROUND

With the large-scale application of new technologies such as network informatization, information security has become an increasingly serious problem. Usually information security we discuss is limited to network security, software security and so on, but recent studies have shown that hardware security should also be of concern.

Hardware design scale is increasing with a hardware design level, making hardware Trojans possible: factors such as current diversified sources of hardware IP (Intellectual Property) used in large-scale circuits represented by CPU (Central Processing Unit), complication of a hardware design process, refined division of the design and manufacturing process and the like result in a decrease in security controllability of hardware final products. The possibility of being implanted with malicious Trojans or loopholes (hereinafter simply referred to as Trojans) when designing increases, and an increase in hardware scale also increases the difficulty in identifying and discovering Trojans. In recent years, with the development of information security concept, hardware security has become a research hotspot of information security.

SUMMARY

In order to solve the above-mentioned problems in the prior art, it is an objective of this disclosure to provide a method, a checking device and a system for determining security of a processor to check hardware security vulnerabilities and improve the security of hardware usage.

In order to achieve the above objective, the method for determining security of a processor provided by an embodiment of the disclosure includes: setting an initial running state of the checking device according to initial running state information of the processor during a target running process, and taking input information of the processor during the target running process as input information of the checking device; causing the checking device to execute a task of the target running process in a manner conforming to predefined behavior to obtain output information and/or final running state information of the checking device, wherein the predefined behavior is a standard of hardware behavior of the processor; and determining whether the processor is secure during the target running process according to the output information and/or the final running state information of the checking device when the checking device completes the task of the target running process.

In order to achieve the above objective, a checking device for determining security of a processor provided by an embodiment of the disclosure includes: a setting unit configured to set an initial running state of the checking device according to initial running state information of the processor during the target running process, and take input information of the processor during the target running process as input information of the checking device; a checking unit configured to execute a task of the target running process in a manner conforming to predefined behavior to obtain output information and/or the final running state information of the checking unit, wherein the predefined behavior is a standard of hardware behavior of the processor; a determining unit configured to determine whether the processor is secure during the target running process according to the output information and/or the final running state information of the checking unit when the checking unit completes the task of the target running process.

In order to achieve the above objective, a checking system for determining security of a processor provided by an embodiment of the disclosure includes: a checked processor, a memory, a peripheral, an input/output (IO) tracer and a checking processor; wherein: the checked processor executes data inputting and outputting with the memory and/or the peripheral during the target running process; the IO tracer records input information and output information between the checked processor and the memory and/or peripheral during the target running process; the checking processor takes input information of the checked processor during the target running process as input information, and sets an initial running state of the checking processor according to initial running state information of the checked processor during the target running process; executes a task of the target running process in a manner conforming to predefined behavior to obtain output information and/or the final running state information of the checking processor, wherein the predefined behavior is a standard of hardware behavior of the processor; and determines whether the checked processor is secure during the target running process according to the output information and/or the final running state information of the checking processor when the checking processor completes the task of the target running process.

As can be seen from the technical solutions provided by the embodiments of the disclosure, by acquiring the input information, the output information and the initial running state and the final running state of the processor during the target running process, and setting the checking device with the same initial running state and input information, the checking device is enabled to execute a same task as the processor under the same conditions to determine whether or not the processor has made behavior other than the task according to the consistency of the output information and/or the final running state between the processor and the checking device, thereby further determining the security of the processor during running process.

In this way, the embodiments of the disclosure can effectively check whether or not behavior of a processor is abnormal, reduce the difficulty in checking hardware security, and improve the security of hardware usage. Additionally, the checking process can be carried out during normal running of a processor, not only to achieve random checking, but also to achieve real-time monitoring with convenience for checking. Further, contents to be checked can be customized by a user, having good portability, and thus the embodiments of the disclosure can be applied for hardware security checks of different models of processors, to solve the problem of a hardware black box of processors, and reduce the checking difficulty.

Of course, implementations of any of the products or methods of the disclosure do not necessarily achieve all of the advantages described above at the same time.

Additional aspects and advantages of the disclosure will be set forth in part in the following descriptions and part of them will be apparent from the following descriptions, or may be learned by practice of the disclosure.

BRIEF DESCRIPTION OF DRAWINGS

In order to more clearly illustrate technical solutions in embodiments of the disclosure or in the prior art, the attached drawings, which are to be used in the descriptions of the embodiments or the prior art, will be briefly described below. It is apparent that the attached drawings in the following description are merely examples of the disclosure, and other drawings may be obtained by those skilled in the art based on these drawings without creative efforts.

DESCRIPTION OF EMBODIMENTS

In order to provide those skilled in the art a better understanding of technical solutions of the disclosure, the technical solutions in the embodiments of the disclosure will be described in a clear and complete manner in conjunction with the attached drawings in the embodiments of the disclosure, and obviously, the described embodiments are merely part of the disclosure, and not all embodiments. All other embodiments obtained by those skilled in the art based on the embodiments of the disclosure without creative work should fall within the protection scope of the disclosure.

Hardware security is a foundation of software security. All implementations of software security are based on an assumption that hardware is trusted, i.e., the hardware should work according to behavior defined by its manual. Currently in most cases performance checking for hardware is carried out when designing or leaving the factory. As hardware appears in the form of a black box in a user's system after leaving the factory (unlike software Trojan, code of which is present in a system, and can be read and analyzed), hardware behavior cannot be monitored or perceived. In addition, due to the difficulty in determining the reasonability of the hardware behavior, there is no research on hardware security.

A method and a device for determining security of a processor proposed by the disclosure can establish a real-time and dynamic checking frame by checking hardware security, thereby solving the problem of hardware security. The method of checking hardware security in the embodiments of the disclosure may be executed by a checking device. In particular, the checking device may be integrated with the processor on a same chip, or may be implemented on a separate chip, or may be implemented as other forms of devices, and the disclosure gives no limitation hereon. For example, a portion of functions of the embodiments of the disclosure may be integrated with the checked processor on a same chip, and the remaining functions may be implemented as a separate chip, and these variations should all fall within the protection scope of the disclosure.

Figure 1:
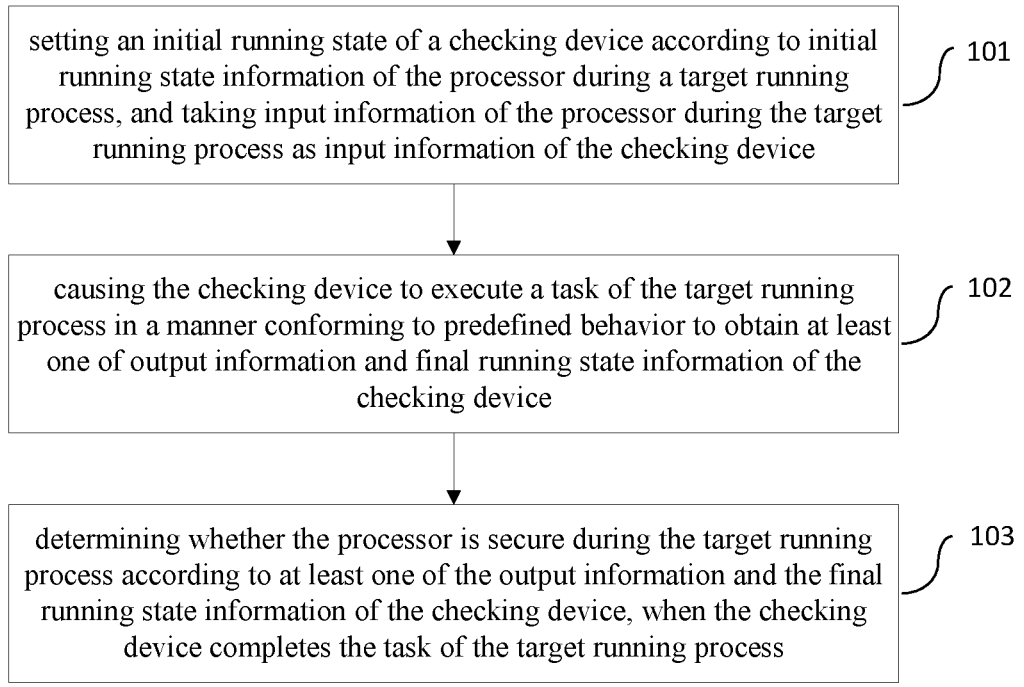
FIG. 1 is a schematic flow diagram of a method for determining security of a processor in accordance with an embodiment of the disclosure.

FIG. 1 is a schematic flow diagram of a method for determining security of a processor in accordance with an embodiment of the disclosure. As shown in FIG. 1, this method includes the following steps.

In step 101, an initial running state of a checking device is set according to initial running state information of the processor during a target running process, and input information of the processor during the target running process is taken as input information of the checking device.

In step 102, the checking device is caused to execute a task of the target running process in a manner conforming to predefined behavior to obtain output information and/or final running state information of the checking device, wherein the predefined behavior is a standard of hardware behavior of the processor.

In step 103, when the checking device completes the task of the target running process, whether or not the processor is secure during the target running process is determined, according to the output information and/or the final running state information of the checking device.

In one embodiment, when determining the security of the processor at runtime, a real-time running process of the checked processor may be divided into one or more checking intervals. For example, an entire running process of the checked processor from startup to shutdown may be taken as a target running process, or the entire running process may be divided into multiple target running processes corresponding to multiple checking intervals. As such, a security check on the processor may be implemented as a security check for a running process (i.e., a target running process) of the processor in a certain checking interval. After the checking device completes a security check of a current checking interval, it continues a security check of a next checking interval. Thus, final running state information of a previous security checking interval may be directly used as initial running state of a current checking interval without having to acquire running state information of the current checking interval again. It should be understood that the embodiments of the disclosure do not limit the number or length of the checking intervals, and that various variations should fall within the protection scope of the disclosure.

The predefined behavior is the standard of the hardware behavior of the processor, wherein the standard of the hardware behavior refers to a behavior standard of the processor in a process of parsing and executing software instruction streams. In one embodiment, the hardware behavior standard of the processor may be a behavior standard specified in a processor specification or other standardized documents. For example, for an instruction set processor, the predefined behavior may include, but is not limited to: instruction behavior specified in an instruction set implemented by the processor, behavior of responding to and processing an interrupt, and behavior of input and output ports of the processor, and the like. In one embodiment, a processor in the checking device may be designed in advance according to the hardware behavior standard of the checked processor, thereby enabling the checking device to conform to the predefined behavior during the running process. In another embodiment, the checking device may be implemented using a reconfigurable processor. In this case, an algorithm may be written in advance according to the hardware behavior standard of the processor and may be stored in a memory of the checking device. Thus, when the checking device is started, it can read a related algorithm from the memory and perform reconfiguration according to the algorithm, so that the checking device meets the requirements of the predefined behavior during the running process.

Since the checked processor is a black box for a user, it is unknown whether or not in an actual running process it executes a task of the target running process in a manner conforming to the predefined behavior. Therefore, it is an important basis for determining the hardware security by comparing similarities and differences between a hardware execution trace of the checked processor and that of the checking device when executing a same task. Here, the predefined behavior may be defined and modified by a user, having good portability, and may be applied to security checks for different models of processors, thereby solving the problem of the hardware black box of the processors.

It will be appreciated by those of ordinary skill in the art that for a deterministic digital circuit, all inputs and internal states of the circuit (values of a memory element) determine an output at the next moment and a next running state of the circuit. Once a state of a finite state machine (for example, an value of an electric level or charge that represents 0/1 stored in an electronic component with memory therein) is determined, and external input data is determined over time for a period of time, a state transition of the state machine during this period of time is therefore determined, and data output over time is also determined during this period of time. In addition, in a case that there is an analog circuit or a non-deterministic digital circuit (e.g., a random number generator) in circuitry, some of inputs (such as values of thermal noise, random samples, etc.) in the circuitry do not appear on an input port of the circuitry. For example, suppose the processor is equipped with a thermal sensor, an output of which is connected to an interrupt signal pin of the processor, wherein the output of the thermal sensor is a 1-bit signal. When the signal is at a high level, the processor jumps into an overheating processing program. This 1-bit signal should be used as a generalized input signal of the processor. A tracing module in the checking device needs to record changes of the signal in a checking interval as part of input information of the checked processor during the target running process. Therefore, it can be determined whether or not the processor has output information other than that expected or indicated in the specification during the running process and whether or not the final running state thereof is abnormal in accordance with the output information and the final running state of the checking device and the processor, thereby determining the hardware security of the processor during the target running process. In this way, the above steps are repeated in accordance with the preset checking period to check the processor, so as to check the security or behavior correctness of the processor in real time, thus ensuring the hardware security of the processor during the running process.

In one embodiment, the checking device may be provided so that the initial running state thereof is the same as the initial running state of the processor during the target running process, and the input information of the processor during the target running process is used as the input information of the checking device, so that the checking device runs with the same input and initial running state as that of the processor, to complete a same computing task as the checked processor. For example, assuming that a task of the checked processor is summation during the target running process, the checking device needs to execute an instruction stream corresponding to the above summation. In one embodiment, a counter may be provided in the checked processor to determine start and end points of the target running process. Specifically, the checking device may load the initial running state of the checked processor, then execute instructions in the instruction stream one by one from the initial running state, wherein the instructions during the execution and operands of the instructions are usually from read and write of a memory (for example, via a processor bus or a memory read-write interface) and read and write of an external device (for example, via a processor bus interface or a specific external device read-write interface). Finally, a sequence of output data is produced.

In one embodiment, prior to setting the initial running state of the checking device according to the initial running state information of the processor during the target running process, the following step is further included: acquiring the initial running state information of the processor during the target running process. Prior to taking the input information of the processor during the target running process as the input information of the checking device, the following step is further included: acquiring the input information of the processor during the target running process. Prior to determining whether the processor is secure during the target running process based on the output information and/or the final running state information of the checking device, the following step is further included: acquiring the output information and/or the final running state information of the processor during the target running process.

In one embodiment, the checking device does not need to pay attention to the time at which an input action occurs in the checked processor, but only needs to acquire contents of the input information. And the output information obtained may include output data and output time, both of which may be used as an important basis for security determination. For example, input data and output data of a predefined signal pin on the processor and the time at which the output action occurs are acquired in real time as the input information and the output information of the target running process, wherein the predefined signal pin is closely related to security determination of the processor. Alternatively, input data and output data for all signal pins on the processor may be obtained, and then necessary information may be selected as the above input information and output information according to the requirement for security determination. For example, in general, an electric level of a signal pin of the processor changes over time or with clocks, and the changing time sequence carries information, so the input or output information acquisition may be achieved by collecting and recording the electric level of the signal pin of the processor and the corresponding timing information.

In one embodiment, the running state of the processor may be acquired at the beginning of the checking interval as the initial running state information, and the running state of the processor may be acquired at the termination of the checking interval as the final running state information. In particular, a processor generally includes a memory such as a register, a buffer or the like, and in this case the processor's running state refers to what is stored in the memory or storage unit of the processor. For example, a mode of a CPU stored in a memory (for example, a user mode, a system mode, a fast interrupt mode, etc.), and operands (for example, a pointer to a current instruction) of execution instructions of a processor stored in a general register may all form part of the running state. Thus, the data stored in the register and/or the cache may be acquired to obtain the processor's running state information.

In a particular embodiment, multiple running states of the processor during the target running process may also be acquired in real time to improve accuracy and reliability of the checking. For example, assuming that a checking interval length is 1 ms, in order to improve the accuracy and reliability of the checking, an intermediate running state may be additionally acquired at 0.5 ms of the checking interval, or the length of the checking interval may be adjusted to 0.5 ms directly.

It should be understood that the embodiments of the disclosure do not limit the time and number of times to acquire the input information, output information, and running state information. For example, in one embodiment, the checking device runs substantially in synchronization with the checked processor. In this case, each input information and output information as well as the initial running state and the final running state of the processor in the checking interval may be acquired in real time respectively. That is, the time at which the input information, the output information, the initial running state and the final running state are acquired may be different. It should be understood that the substantially synchronous running means that a difference between the running time of the checking device and the checked processor is within a preset threshold, and the embodiments of the disclosure does not limit the size of the threshold.

In another embodiment, the checking device runs at a certain period lagging behind the checked processor. In this case, the checking device may record in real time at least a part of the input information, the output information, and the running state information in the target running process in advance, and then input information, output information, and running state information needed for the check are obtained from the information recorded above for the security check. Here, the lagging period of the checking device may be set according to actual needs, and the embodiments of the disclosure don't have any limitation hereon.

In one embodiment, if the starting point of the checking interval falls within a reset validity period of the checked processor, the checking device only needs to set the initial running state of the checking device according to a predefined reset value, without having to acquire the initial running state information of the checked processor in real time. In particular, the predefined reset value may be determined according to the predefined behavior.

According to an embodiment of the disclosure, when determining whether or not the processor is secure during the target running process based on the output information and/or the final running state information of the checking device, the output information of the checking device is compared with the output information of the processor during the target running process to obtain a first comparison result, and/or the final running state of the checking device is compared with the final running state of the target running process to obtain a second comparison result. Then, based on the first comparison result and/or the second comparison result, it is determined whether the processor is secure during the target running process.

According to an embodiment of the disclosure, when it is determined whether or not the processor is secure during the target running process based on the first comparison result and the second comparison result, if the first comparison result indicates that the output information of the checking device is consistent with the output information of the processor during the target running process, and the second comparison result indicates that the final running state information of the checking device is consistent with the final running state information during the target running process, it is determined that the processor is secure during the target running process. When the first comparison result indicates that the output information of the checking device is not consistent with the output information of the processor during the target running process, or the second comparison result indicates that the final running state information of the checking device is not consistent with the final running state information during the target running process, it is determined that the processor is not secure during the target running process.

It will be understood by those of ordinary skill in the art that, when determining whether or not the output information is consistent and the final running state is consistent, determination criteria may be set according to design requirements, and the embodiments of the disclosure should not be limited to respective attributes of compared contents being exactly consistent. It should also be understood that, in a checking interval, registers involved in executing different software instruction streams may be different, and it is necessary to determine that the registers associated with the execution instructions have same changes as the checking device, and that unrelated registers remain unchanged, in order to determine the running process of the processor is secure. In one embodiment, it is not necessary to distinguish specific registers involved in the execution of the corresponding instruction stream in the current checking interval. If all the final running states of the checking device are consistent with all the acquired final running states of the checked processor, the processor can be determined to be secure during the target running process.

According to an embodiment of the disclosure, the output information of the processor during the target running process and the output information of the checking device include output data and/or output time, respectively. In the comparison of the output information of the checking device with the output information of the processor during the target running process to obtain the first comparison result, the output information of the checking device is compared with the output information of the processor during the target running process to obtain the first comparison result, based on an order of the output data and/or contents of the output data.

Specifically, time of the processor in a running process may be determined by an instruction sequence number, i.e., the input information of the processor during the running process may be represented as a time sequence of input data. Alternatively, it may be expressed as a sequence of input data corresponding to the instruction sequence number of the processor. As such, the output data and the output time contained in the output information may be also represented by a sequence as described above, that is, the output is in a form of time sequence. Therefore, whether or not output sequence information is abnormal may be determined by determining whether or not the output order is abnormal, or the order of the output data and the contents of the output data may be compared to determine if the output information of the processor is abnormal. In one embodiment, when either the contents or the order of the output data is abnormal, it is determined that the output information of the checked processor is not consistent with the output information of the checking device, thereby determining that the processor is not secure. In one embodiment, whether the output information of the processor is abnormal may be determined based on time or a time interval of the output data.

According to an embodiment of the disclosure, prior to determining whether or not the processor is secure during the target running process based on the output information and/or the final running state information of the checking device, the following step is further included: based on the predefined behavior, determining whether the initial running state and/or the final running state of the processor during the target running process is legal. For example, assuming that the predefined behavior specifies: Register 2=(Register 1)+1, the checking device may determine whether or not the initial running state and/or the final running state of the checked processor meet the above criterion based on the predefined behavior. If the above criterion is not met, it is indicated that the initial running state or the final running state is not legal, and then it is determined that the processor is not secure during the target running process. If the above criterion is met, it is indicated that the initial running state or the final running state is legal. In one embodiment, after determining that the initial running state of the checked processor is legal, the checking device continues the checking, otherwise the checking of the target running process is terminated. In one embodiment, it is firstly determined whether or not the final running state is legal at the termination of the checking interval, and if it is determined to be legal, the output information and/or the final running state information of the checking device and the checked processor are compared.

According to an embodiment of the disclosure, the initial running state information of the processor during the target running process is data stored in a memory corresponding to a set of feature states at the beginning of the target running process. The final running state of the processor during the target running process is data stored in a memory corresponding to a set of feature states at the termination of the target running process, wherein the output information and a next running state of the target running process can be determined based on the current running state, the input information, and the set of feature states of the target running process.

It should be understood that a true internal state of the processor may be represented by one set of feature states. In this way, when acquiring the running state of the processor during the target running processor, only running state information corresponding to a set of feature states required for correctness verification or security verification of the processor needs to be obtained, without obtaining redundant running state information. The set of feature states can represent running features of the processor. For example, in a case where a current state and the input information of the processor are definite, a next state and output of the processor can be uniquely determined according to the set of feature states. The set of feature state is a subset of a set of running states and can be obtained by deleting redundant contents in the running state. For example, in a running state of the processor, if a value of a register is always equal to a value of another register, the value of one of the registers may be deleted from the running state. For another example, if there is a clear correspondence between memories, redundant information therein may be deleted in order to improve running efficiency of the checking device. For example, if a value of register 1+a value of register 2=a value of register 3, the value of register 3 can be deleted. This reduces redundancy of the running state information collected, and reduces an amount of data collected and an amount of computation, thereby reducing resource consumption and increasing the checking speed.

In one embodiment of the disclosure, the checked processor is an instruction set processor, and the above set of feature states may be determined according to an instruction set of the processor. For example, when designing a processor, its instruction set is usually defined, which mainly indicates two parts: the processor's internal state registers, and processing of each of these instructions for these internal state registers. However, for a modern processor, states designed within it has been far more complicated than internal states defined by the instruction set. For example, an X86 processor has only 16 general-purpose registers, but the processor usually uses hundreds of registers to implement as the general-purpose registers by renaming the registers, that is, the processor dynamically allocates physical registers at run time as one of the 16 general-purpose registers logically. In this way, when obtaining the processor's running state, there is no need to obtain states of hundreds of registers above, that is, internal implementations of the processor (for example, hundreds of physical registers) may be ignored, but the 16 logical registers or a set of states defined by the instruction set are directly recorded and used to represent the current state of the processor. In this way, the set of states of the 16 logical registers is determined as the set of feature states of the processor. This can simplify the process of recording the processor's running states and improve the speed of determining the security.

It should be understood that the above method of determining the set of feature states is only one embodiment of the disclosure, and that the scope of the set of feature states may be adjusted as needed when implementing the embodiments of the disclosure. For example, only a set of states in the above 16 logic registers, related to the security determination of the processor, is selected as the set of feature states, and whether a processor is related to the security determination of the processor may also be determined based on whether a next state, the output information, the state transition and the output value of the processor are reasonable. For example, a register that stores an instruction of transferring a value from address A to address B is useful. During the running process, the state of the processor changes from one moment to another, and if a register plays a critical role in a state transition of the processor, such a register is a register related to the security determination of the processor. In addition, other manners instead of the instruction set may also be used to determine a set of feature state representing running features of the processor, and there are various specific implementations, which will not be enumerated here.

It also should be understood that the embodiments of the disclosure do not limit the type of the processor being checked. When executing a security check on other types of processors, redundant running state information may also be removed and only running state information corresponding to a set of feature states required for correctness verification or security verification is obtained.

According to one embodiment of the disclosure, the memory comprises a register and/or a cache.

According to one embodiment of the disclosure, the processor is an instruction set processor, and the instruction set used may be an existing instruction set such as an X86 instruction set, an RISC instruction set, or other instruction sets that may be present in the future.

It should be noted that the checking device needs to execute a same task (i.e., an instruction stream) as the checked processor in a manner that conforms to the predefined behavior. For the ease of understanding, the running process of the checking device in the embodiments of the disclosure will be described in detail taking a summation task as an example. It is to be understood that the embodiments of the disclosure are not limited thereto.

Assume that only one ADD instruction is executed by the checked processor in a checking interval. An initial running state of the checked processor is that an instruction pointer register is pointing to a next instruction to be executed by the processor, an address of which in the memory is A. An addition instruction {ADD R1, R1, [0X0CC]} is stored in address A. The function of the addition instruction is to add a value of register A and data stored in address 0X0CC of the memory, and store the result in the register R1. The instruction pointer register is A+1 after the instruction is executed. As such, an instruction pointer is A in the initial running state of the checked processor, and a value of the register R1 is an original value recorded as v_r1_first. In this way, the checking device will capture that the checked processor reads a value v_0x0cc (i.e., input information) from address 0X0CC. The checking device also records an instruction pointer as B in the final running state of the processor, and a value of the register R1 as v_r1_last. If the checking device runs lagging behind the checked processor, all of the above data can be acquired at the termination of the above checking interval.

In this way, according to the initial running state of the checked processor, the initial running state of the checking device may be set as follows: an instruction pointer is A and an value of R1 is v_r1_first. The input information v_0x0cc of the checked processor is used as input information so that the checking device executes the task (i.e., the ADD instruction) in the target running process in a manner that conforms to the predefined behavior. After the checking device executes the above ADD instruction, the final running states (the values of the instruction pointer and the register R1) of the checking device and the checked processor are compared. If the two are consistent (the instruction pointers are both B and the values of the register R1 are both v_r1_last), the checked processor is secure. If the two are not consistent (the instruction pointer of the checking device is not B or the value of the register R1 of the checking device is not v_r1_last), the checked processor is not secure.

As can be seen from the above example, since the checked processor does not have output information in the checking interval, the security of the processor may be determined only on the basis of the final running state. It is to be understood that, in other embodiments, the checking device may directly determine the checked processor is not secure when jumping to the end point of the checking due to a failure of executing a task. In another embodiment, the checking device compares the output information in real-time in the process of executing the task, and once it finds that its output information is not consistent with the output information of the checked processor, it can determine that the checked processor is not secure, and therefore terminate the checking of the current target running process. That is, the checking device may determine whether or not the checked processor is secure based on the output information, the final running state information, or the combination of the two, and various variations that conforms to the above objective of the disclosure should fall within the protection scope of the embodiments of the disclosure.

According to an embodiment of the disclosure, when checking device executes the task of the target running process in a manner conforming to the predefined behavior, the following step is included: stopping, by the checking device, executing the task and determining that the processor is not secure during the target running process when the checking device fails to execute the task. For example, in the process of executing the task by the checking device in a manner that conforms to the predefined behavior, the checking device stops executing the current task if the current task cannot be executed according to the input information. At this point, the checking device can jump directly to the end point of the checking process, and then directly determine the checked processor is not secure, or the current state of the checking device may be compared with the final running state of the checked processor to determine whether or not the checked processor is secure.

With the embodiments of the disclosure, the checking device is enabled to execute a same task as the processor under same conditions by acquiring the input information, the output information and the initial running state and the final running state of the processor during the target running process, and setting the checking device with the same initial running state and input information. Finally, whether the processor has made behavior other than the task based on the consistency of the output information and the final running state of the processor and the checking device, thereby determining the security of the processor during the running process. With the embodiments of the disclosure, whether or not the hardware behavior of the processor is abnormal can be effectively checked, the difficulty of the hardware security check can be reduced, and the security of hardware use can be improved. Additionally, the checking process of the embodiments of the disclosure can be carried out during normal running of the processor, which can realize both random checking and real-time monitoring. And contents to be checked can be customized by a user, having good portability. The embodiments of the disclosure can be applied to the hardware security check of different models of processors, solving the problem of the hardware black box of processors.

Hereinafter, specific embodiments of the disclosure will be described by way of example and the similar descriptions as the foregoing will not be repeated.

Figure 2:
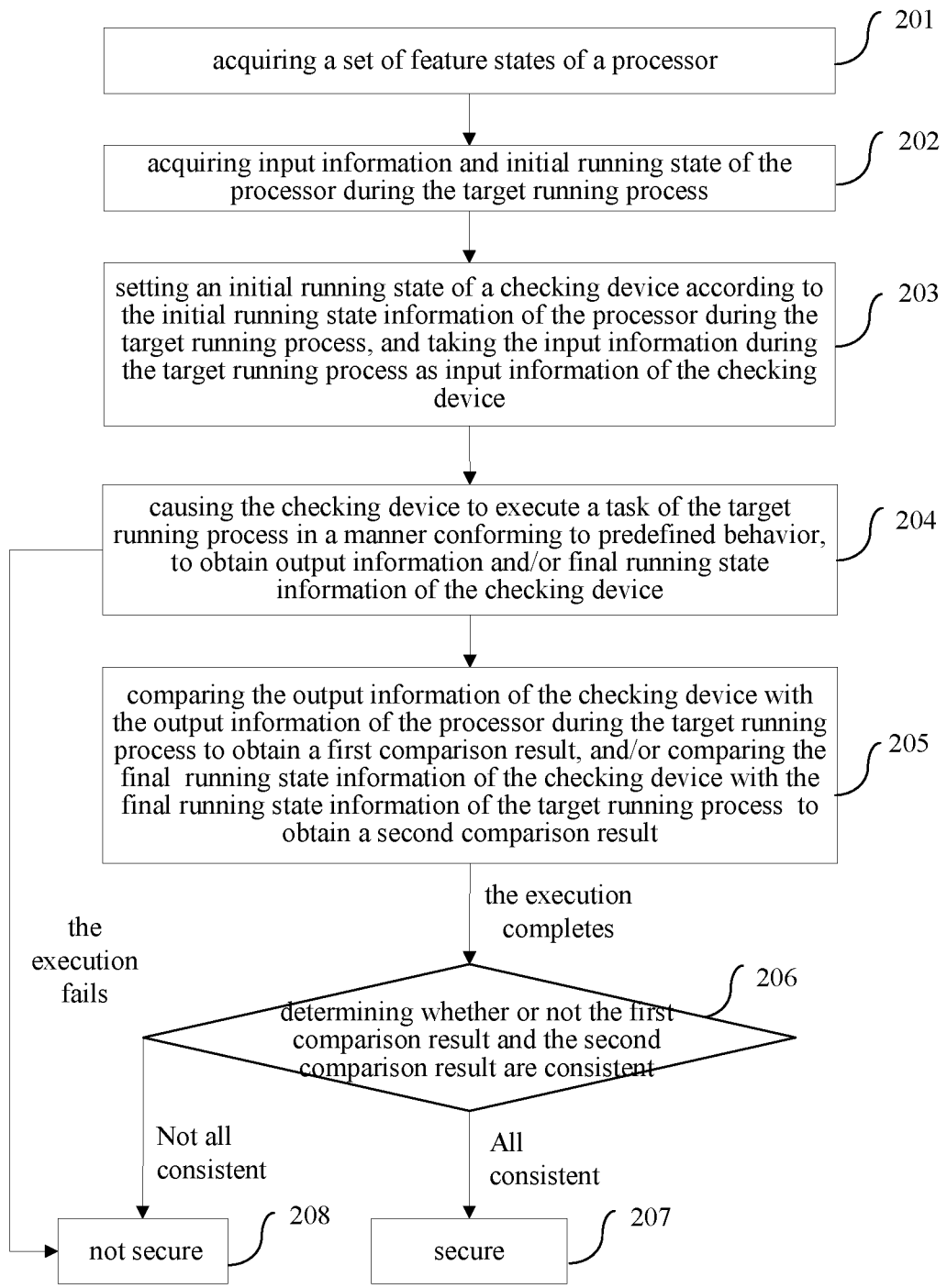
FIG. 2 is a schematic flow diagram of a method for determining security of a processor in accordance with another embodiment of the disclosure.

FIG. 2 is a schematic flow diagram of a method for determining security of a processor in accordance with another embodiment of the disclosure. As shown in FIG. 2, the method includes the following steps.

Step 201, a set of feature states of a processor is acquired.

Step 202, input information and initial running state of the processor during the target running process are acquired.

Wherein, the initial running state is data stored in a memory corresponding to a set of feature states at the beginning of the target running process.

Step 203, an initial running state of a checking device is set according to the initial running state information of the processor during the target running process, and the input information during the target running process is taken as input information of the checking device.

Step 204, the checking device is caused to execute a task of the target running process in a manner conforming to predefined behavior, to obtain output information and/or final running state information of the checking device, wherein the predefined behavior is a standard of hardware behavior of the processor.

Wherein, the output information may include output data and/or output time, and the final running state is data stored in a memory corresponding to a set of feature states at the termination of the target running process, wherein the output information may be represented by an output sequence.

If the checking device completes the task of the target running process, step 205 is executed, and if the checking device fails to execute the task, the execution of the task is stopped and step 208 is executed.

Step 205, the output information of the checking device is compared with the output information of the processor during the target running process to obtain a first comparison result, and/or the final running state information of the checking device with the final running state information of the target running process to obtain a second comparison result.

Specifically, the first comparison result may be obtained by comparing the output information of the checking device with the output information of the processor during the target running process in accordance with an order of the output data and/or contents of the output data. Similar descriptions as the foregoing embodiments will not be repeated here.

Step 206, whether or not the first comparison result and the second comparison result are consistent is determined. When the first comparison result indicates that the output information of the checking device is consistent with the output information of the processor during the target running process, and the second comparison result indicates that the final running state of the checking device is consistent with the final running state of the target running process, step 207 is executed; when the first comparison result indicates that the output information of the checking device is not consistent with the output information of the processor during the target running process, or the second comparison result indicates that the final running state of the checking device is not consistent with the final running state of the target running process, step 208 is executed.

Step 207, it is determined that the processor is secure during the target running process.

Step 208, it is determined that the processor is not secure during the target running process.

In the embodiments of the disclosure, the checking device is enabled to execute a same task as the processor under same conditions by acquiring the input information, the output information and the initial running state and the final running state of the processor during the target running process, and setting the checking device with the same initial running state and input information. Finally, whether the processor has made behavior other than the task based on the consistency of the output information and the final running state of the processor and the checking device, thereby determining the security of the processor during the running process. In the embodiment of the disclosure, whether or not the hardware behavior of the processor is abnormal can be effectively checked, the difficulty of the hardware security check can be reduced, and the security of hardware use can be improved. Additionally, the checking process of the embodiments of the disclosure can be carried out during normal running of the processor, which can realize both random checking and real-time monitoring, and does not have significant influence on the running of the processor. And the contents to be checked can be customized by a user, having good portability. The embodiments of the disclosure can be applied to the hardware security check of different models of processors, solving the problem of the hardware black box of processors.

In accordance with the same concept of the disclosure, embodiments of the disclosure also provide a checking device for determining security of a processor, which may be configured to implement the method described in the above embodiments, as described in the following embodiments. Since the principle of solving the problem by the checking device for determining security of a processor is similar to that of the method for determining security of a processor, the checking device for determining the security of the processor may be implemented with reference to the implementations of the method for determining the security of the processor, and similar descriptions will not be repeated. As used hereinafter, the term "unit" or "module" may implement a combination of software and/or hardware with predetermined functions. Although the device described in the following embodiments are preferably implemented in software, implementations in hardware or a combination of software and hardware are also possible and conceivable.

Figure 3:
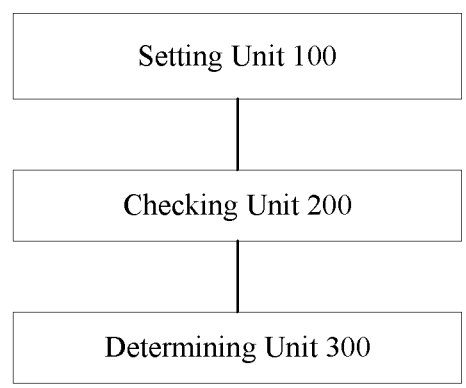
FIG. 3 is a schematic diagram of a structure of a checking device for determining security of a processor in accordance with an embodiment of the disclosure.

FIG. 3 is a schematic diagram of a structure of a checking device for determining security of a processor according to an embodiment of the disclosure. The device of this embodiment may include logical components that implement corresponding functions or may be an electronic device running with corresponding functional software.

As shown in FIG. 3, the checking device for determining the security of the processor includes a setting unit 100, a checking unit 200, and a determining unit 300.

Specifically, the setting unit 100 is configured to set an initial running state of the checking unit according to initial running state information of the processor during a target running process, and take input information of the processor during the target running process as input information of the checking unit.

The checking unit 200 is configured to execute a task of the target running process in a manner conforming to predefined behavior to obtain output information and/or final running state information of the checking unit, wherein the predefined behavior is a standard of hardware behavior of the processor.

The determining unit 300 is configured to determine whether the processor is secure during the target running process based on the output information and/or the final running state information of the checking unit, when the checking unit completes the task of the target running process.

In the embodiments of the disclosure, the checking device is enabled to execute a same task as the processor under same conditions by acquiring the input information, the output information and the initial running state and the final running state of the processor during the target running process, and setting the checking device with the same initial running state and input information. Finally, whether the processor has made behavior other than the task is determined based on the consistency of the output information and the final running state of the processor and the checking device, and then the security of the processor during the running process is determined. Thus, whether or not the behavior of the processor is abnormal can be effectively checked, the difficulty of hardware security check can be reduced, and the security of hardware use can be improved. In addition, the checking process can be carried out during normal running of the processor conveniently, which can realize both random checking and real-time monitoring, and the running of the processor is not influenced significantly. The contents to be checked can be customized by a user, having good portability. The embodiments of the disclosure can be applied to the hardware security check of different models of processors, solving the problem of the hardware black box of processors and reducing the difficulty in the checking.

In a specific embodiment, the checking device further includes a tracing unit 400 configured to record the initial running state information, the input information, the output information, and the final running state information of the processor during the target running process. For example, in one embodiment, when the running process of the checking device lags behind the target running process of the checked processor, the tracing unit may record the input information, the output information, the initial running state and/or the final running state of the checked processor during the target running process. In this way, when the checking device executes the task of the target running process, the information recorded by the tracing unit can be directly read for checking, thereby increasing flexibility of checking time. It is to be understood that, in a case where the checking device runs substantially in synchronization with the checked processor, the tracing unit may further be configured to intercept and record the above initial running state information, the input information, the output information, and the final running state information, for read and use by the checking device.

In a specific embodiment, the determining unit 300 is further configured to: compare the output information of the checking device with the output information of the processor during the target running process to obtain a first comparison result, and compare the final running state of the checking device with the final running state of the target running process to obtain a second comparison result; determine whether the processor is secure during the target running process based on the first comparison result and the second comparison result.

In a specific embodiment, the determining unit 300 is further configured to: determine that the processor is secure during the target running process when the first comparison result indicates that the output information of the checking device is consistent with the output information of the processor during the target running process and the second comparison result indicates that the final running state of the checking device is consistent with the final running state of the target running process; and determine that the processor is not secure during the target running process when the first comparison result indicates that the output information of the checking device is not consistent with the output information of the processor during the target running process, or the second comparison result indicates that the final running state of the checking device is not consistent with the final running state of the target running process.

In a specific embodiment, the output information of the processor during the target running process and the output information of the checking device include output data and/or output time, respectively; the determining unit is further configured to compare the output information of the checking device with the output information of the processor during the target running process to obtain the first comparison result based on an order of the output data and/or contents of the output data.

In a specific embodiment, the determining unit is further configured to determine whether the initial running state and/or the final running state of the processor during the target running process is legal based on the predefined behavior.

In a specific embodiment, the initial running state of the target running process is data stored in a memory corresponding to a set of feature states at the beginning of the target running process; the final running state of the target running process is data stored in a memory corresponding to a set of feature states at the termination of the target running process, wherein the output information and a next running state of the target running process can be determined based on the current running state, the input information, and the data stored in the memory corresponding to the set of feature states of the target running process. In a specific embodiment, the memory includes registers and/or caches.

In a specific embodiment, the processor is an instruction set processor, and the set of feature states is determined according to an instruction set of the processor.

In a specific embodiment, when the checking unit fails to execute the task, the checking unit stops executing the task, and the determining unit determines that the processor is not secure during the target running process.

Figure 4:
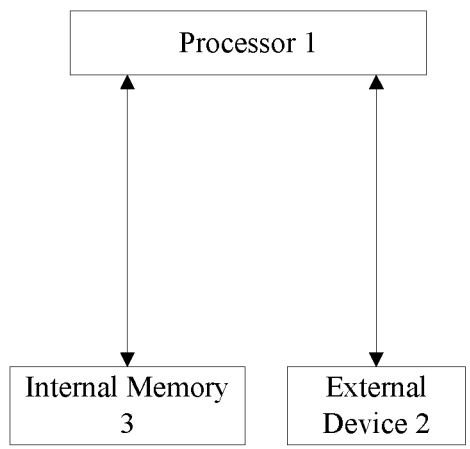
FIG. 4 is a schematic diagram of a structure of a common processor system.
Figure 5:
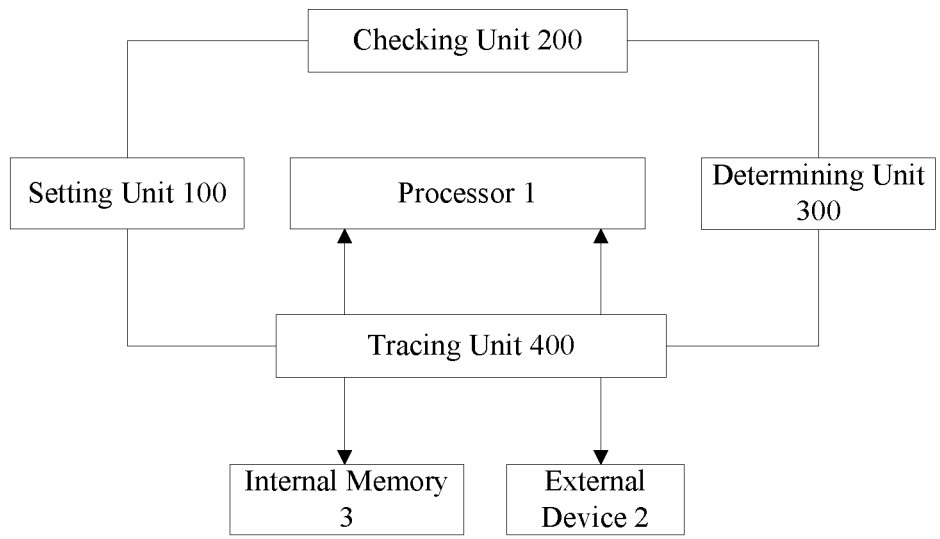
FIG. 5 is a schematic diagram of an applicable structure of a checking device for determining security of a processor in accordance with another embodiment of the disclosure.

FIG. 4 is a schematic diagram of a structure of a common processor system, in which a processor 1 interacts with an external device 2 to generate inputs and outputs, and running state information of the processor during the running process is stored by an internal memory 3. FIG. 5 is a schematic diagram of an applicable structure of a checking device for determining security of a processor according to an embodiment of the disclosure. The tracing unit 400 may be provided at respective signal pins of a processor to obtain input information, output information, and running state information of the processor during the target running process. The checking unit 200 and the determining unit 300 may be integrated with the processor on a single chip, or may be implemented on a separate chip. In one embodiment, all inputs and outputs of the processor may be recorded. The storage of the running states of the processor may be implemented using hardware, software, or through cooperation of the two, for example, an interface may be reserved for some of hardware of the processor, so that the states of the processor may be exported via a hardware mechanism. If no hardware interface is reserved, the states of the processor may be read and saved by running assistant software on the processor.

The above embodiments of the disclosure are applicable to checks for a variety of models of processors, and two specific embodiments are briefly described below.

Embodiment One

For checking an X86 Xeon processor, input and output information of the processor is acquired by monitoring the processor states of cores of the X86 (most of register states in the processor may be obtained in combination with instructions such as the X86 processor XSAVE and the like) and by monitoring SMBUS/JTAG/PCIe/QPI/DDR/IRQ interfaces and the like of the processor by the tracing unit 400. The above-described method and device of the disclosure may be used to check running security of the X86 Xeon processor.

Embodiment Two

For checking an ARM processor, JTAG (Joint Test Action Group) may suspend the processor and acquire internal register states of the processor, and external input and output data of the processor cores may be acquired through a bus interface and IRQ (Interrupt Request) interface. The above-described method and device of the disclosure may be used to check running security of the ARM processor.

With the method and device in the above embodiments of the disclosure, the checking device is enabled to execute a same task as the processor under same conditions by acquiring the input information, the output information and the initial running state and the final running state of the processor during the target running process, and setting the checking device with the same initial running state and input information. Finally, whether the processor has made behavior other than the task is determined based on the consistency of the output information and the final running state of the processor and the checking device, thereby determining the security of the processor during the running process. Thus, whether or not the behavior of the processor is abnormal can be effectively checked, the difficulty of a hardware security check can be reduced, and the security of hardware use can be improved. Additionally, the checking process can be carried out during normal running of the processor conveniently, which can realize both random checking and real-time monitoring, and the running of the processor is not influenced significantly. Contents to be checked can be customized by a user, having good portability. The embodiments of the disclosure can be applied to the hardware security check of different models of processors, solving the problem of the hardware black box of processors and reducing the difficulty in the checking.

An embodiment of the disclosure also provides a storage medium having a computer-readable program stored thereon, wherein the computer-readable program causes a computer to execute the method of determining security of a processor in the above-described embodiments in an information processing device or a user equipment.

An embodiment of the disclosure also provides a computer-readable program in which a program causes a computer to execute the method of determining security of a processor in the above-described embodiments in an information processing device or a user equipment when executed in the information processing device or the user equipment.

Figure 6:
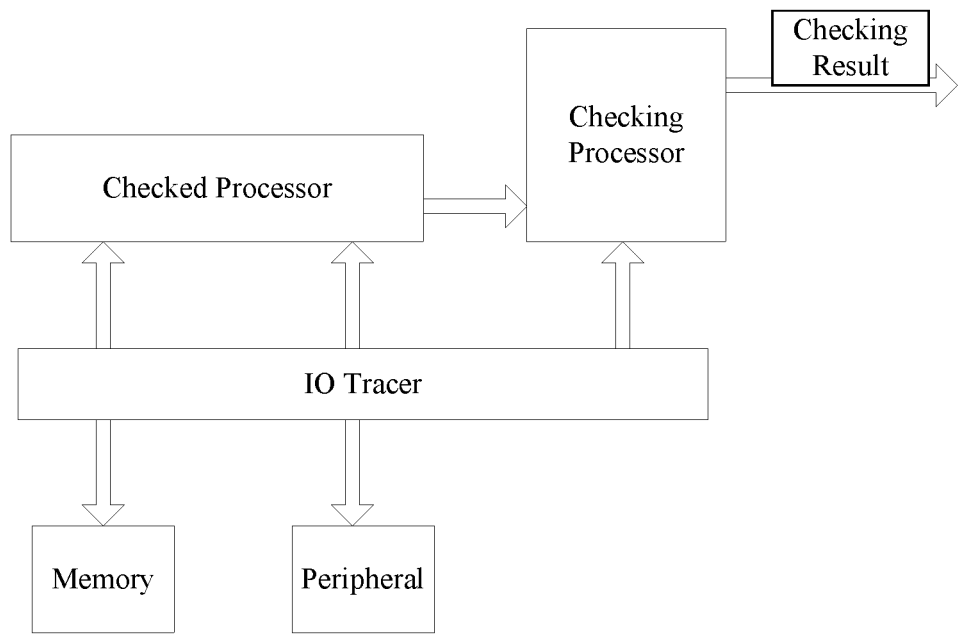
FIG. 6 is a schematic diagram of a hardware structure of a specific embodiment of the disclosure.

As shown in FIG. 6, an embodiment of the disclosure also provides a checking system including: a checked processor, a memory, a peripheral, an input/output (IO) tracer, and a checking processor;

The checked processor carries out inputting and outputting of data with the memory and/or the peripheral during a target running process;

The IO tracer records input information and output information between the checked processor and the memory and/or peripheral during the target running process;

The checking processor takes the input information of the checked processor during the target running process as input information and sets an initial running state of the checking processor according to the initial running state information of the checked processor during the target running process; executes a task of the target running process in a manner conforming to predefined behavior to obtain output information and/or final running state information of the checking processor, wherein the predefined behavior is a standard of hardware behavior of the checked processor; and determines whether or not the checked processor is secure during the target running process based on the output information and/or the final running state information of the checking processor when the checking processor completes the task of the target running process.

As an embodiment of the disclosure, the checking processor acquires the initial running state and/or the final running state of the checked processor through a hardware interface of the checked processor.

As an embodiment of the disclosure, the initial running state information and/or the final running state information of the checked processor are read by means of software, the initial running state information and/or the final running state information are stored in a memory, and the checking processor reads the initial running state information and/or the final running state information from the memory. The memory here may be a nonvolatile memory or a volatile memory.

As an embodiment of the disclosure, the IO tracer further includes a memory tracer and a peripheral tracer. The memory tracer is configured to record the input information and output information between the checked processor and the memory during the target running process, and the peripheral tracer is configured to record the input information and output information between the checked processor and the peripheral during the target running process.

As an embodiment of the disclosure, the input and output information between the checked processor and the memory during execution of the task of the target running process, and the input and output information between the checked processor and the peripheral during execution of the task of the target running process are all stored in the memory, and the checking processor reads the input and output information in the memory. The memory here may be a nonvolatile memory or a volatile memory.

As an embodiment of the disclosure, the checking processor is configured to compare the output information of the checking processor with the output information of the checked processor during the target running process to obtain a first comparison result, and/or compare the final running state information of the checking processor with the final running state information of the checked processor during the target running process to obtain a second comparison result; and determine whether the processor is secure during the target running process based on the first comparison result and/or the second comparison result.

As an embodiment of the disclosure, the checking processor is configured to determine that the processor is secure during the target running process when the first comparison result indicates that the output information of the checking processor is consistent with the output information of the checked processor during the target running process and the second comparison result indicates that the final running state information of the checking processor is consistent with the final running state information of the checked processor during the target running process; and determine that the processor is not secure during the target running process when the first comparison result indicates that the output information of the checking processor is not consistent with the output information of the checked processor during the target running process, or the second comparison result indicates that the final running state information of the checking processor is not consistent with the final running state information of the checked processor during the target running process.

As an embodiment of the disclosure, the output information includes output data and/or output time, and the checking processor is configured to compare the output information of the checking processor with the output information of the checked processor in the target running process according to an order of the output data and/or contents of the output data to obtain the first comparison result.

As an embodiment of the disclosure, the initial running state information of the target running process is data stored in a memory corresponding to a set of feature states at the beginning of the target running process; the final running state information of the target running process is data stored in a memory corresponding to a set of feature states at the termination of the target running process.

Wherein, the output information and a next running state of the target running process can be determined based on the current running state, the input information, and the set of feature states of the target running process, and the memory includes a register and/or a cache.

As an embodiment of the disclosure, the set of feature states is determined according to an instruction set of the processor.

As an embodiment of the disclosure, when the checking processor fails to execute the task of the target running process, the checking processor stops executing the task of the target running process, and determines that the processor is not secure during the target running process.

Figure 7:
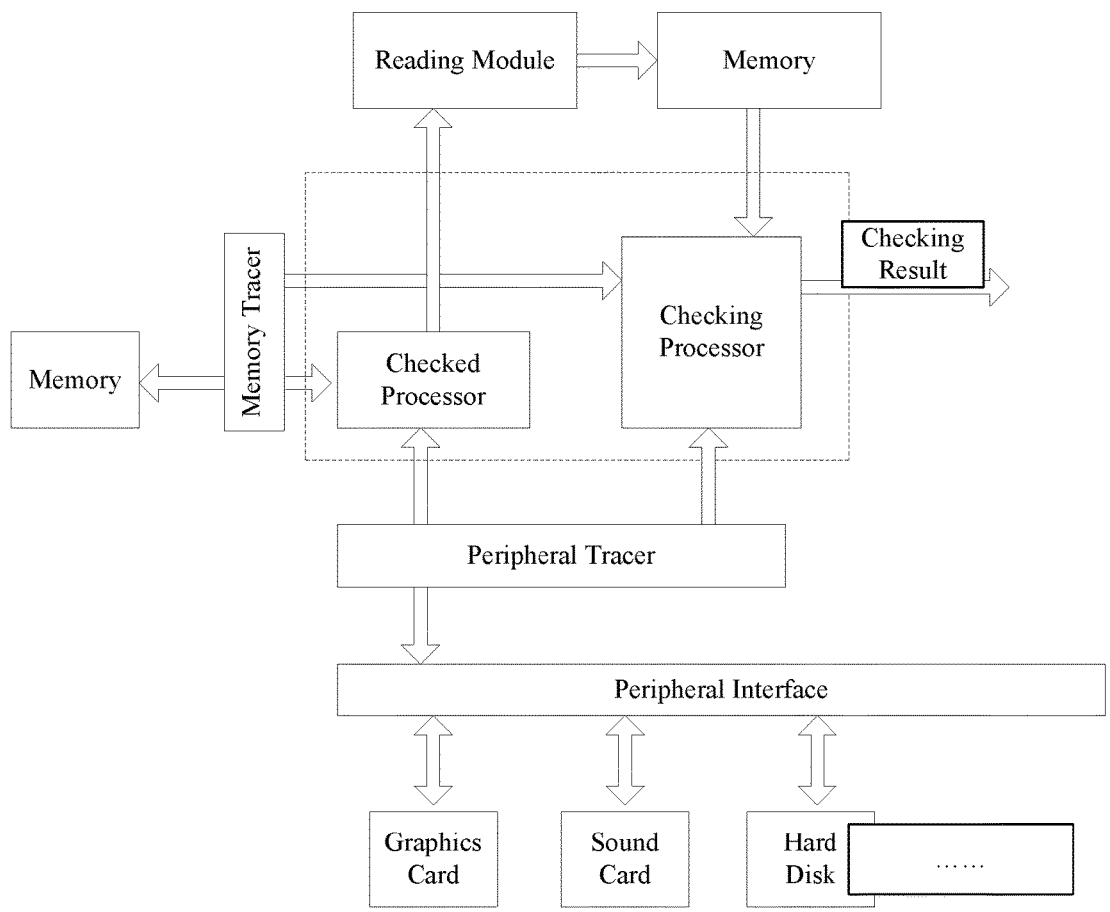
FIG. 7 is a schematic diagram of a hardware structure of another specific embodiment of the disclosure.

FIG. 7 shows a schematic diagram of a hardware structure of a specific embodiment of the disclosure. As shown in FIG. 7, an input/output tracer (ITR, IO Tracer) is provided between a checked processor and a peripheral interface, and a memory tracer (MTR, Memory Tracer) is provided between the checked processor and a memory. When the checked processor processes a task of a target running process, the peripheral tracer and the memory tracer read input and output information between the checked processor and the peripheral and between the checked processor and the memory respectively, and a read module reads data stored in a register and/or a cache of the checked processor to obtain initial running state information and final running state information, and record them into the memory. The checking processor acquires the above input/output information and the running state information, executes the same task with the same input information and initial running state, and compares the output information and the final running state with the output information and the final running state of the checked processor respectively, and outputs a check result of whether the checked processor is secure during the target running process, wherein the reading module may be a program running on the checked processor and this program may acquire the running state information of the checked processor and store it in the memory.

Figure 8:
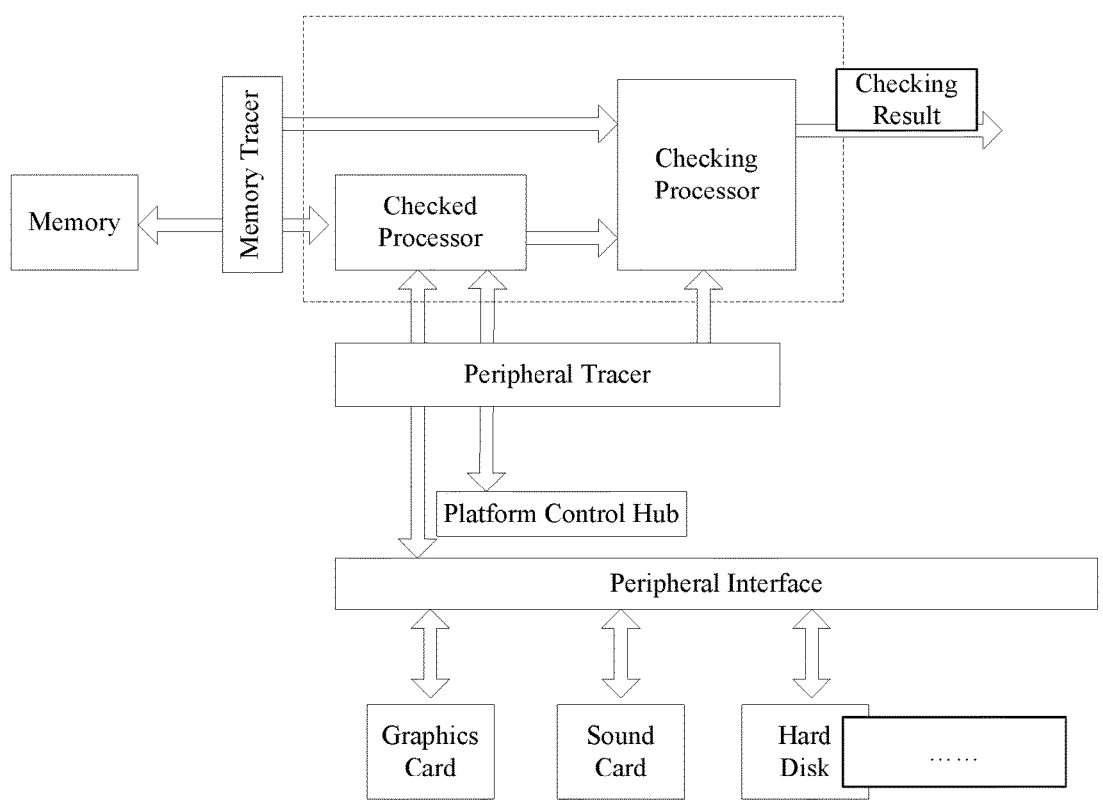
FIG. 8 is a schematic diagram of a hardware structure of another specific embodiment of the disclosure.

FIG. 8 is a schematic diagram of a hardware structure of another embodiment of the disclosure. As an example, a checked processor is an Intel processor, as shown in FIG. 8. The checked processor may manage a peripheral interface through a platform control hub (PCH, Platform Control Hub), and an IO tracer is provided between the checked processor, and the platform control hub and the peripheral interface, and reads information transmitted between the checked processor, and the platform control hub and peripheral interface. The checking processor can directly obtain the running state information of the checked processor without using a reading module and a storing module. As shown in FIG. 6, the MTR and ITR can also be integrated as an input/output (IO) tracer, which sends the read input/output data to the checking processor.

According to the above embodiments of the disclosure, the checking device is enabled to execute a same task as the processor under same conditions by acquiring the input information, the output information, the initial running state and the final running state of the processor during the target running process, and setting the checking device with the same initial running state and input information. Finally, whether the processor has made behavior other than the task is determined based on the consistency of the output information and the final running state of the processor and the checking device, thereby determining the security of the processor during the running process. Whether or not the behavior of the processor is abnormal can be effectively checked, the difficulty of the hardware security check can be reduced, and the security of hardware use can be improved. Additionally, the checking process can be carried out during normal running of the processor conveniently, which can realize both random checking and real-time monitoring, and the running of the processor is not influenced significantly. Contents to be checked can be customized by a user, having good portability. The embodiments of the disclosure can be applied to the hardware security checks of different models of processors, solving the problem of the hardware black box of processors and reducing the difficulty in the checking.

The system, device, modules or units as set forth in the above embodiments may be implemented by a computer chip or an entity, or by a product having a certain function.

For convenience of description, the functions are divided into various units respectively when describing the above devices. Of course, the functionality of each unit may be implemented in same or multiple software and/or hardware when implementing the disclosure.

Each of the embodiments in this specification is described in a progressive manner, same or similar parts between the various embodiments may be referred to each other, and each embodiment is focused on the differences from other embodiments. In particular, for the embodiments of the system, since they are substantially similar to the embodiments of the method, relatively brief descriptions are provided and the relevant aspects refer to portions of the descriptions of the embodiments of the method.

While the disclosure has been described by way of embodiments, those of ordinary skill in the art will recognize that the disclosure has many modifications and variations without departing from the spirit of the disclosure, and that the claims are intended to cover such modifications and variations without departing from the spirit of the disclosure.

What is claimed is:

1. A method for determining security of a processor, comprising:

acquiring an initial running state of the processor during a target running process through at least one of software and an interface of hardware at a beginning of the target running process, to obtain initial running state information of the processor during the target running process, wherein, the target running process is a sub-process of a real-time running process of the processor;

recording data read by the processor from a memory and at least one of a peripheral, an analog circuit inside the processor and a non-deterministic digital circuit inside the processor, to obtain input information of the processor during the target running process;

setting an initial running state of a checking device according to initial running state information of the processor during the target running process, and taking input information of the processor during the target running process as input information of the checking device;

causing the checking device to execute a task of the target running process in a manner conforming to predefined behavior to obtain at least one of output information and final running state information of the checking device, wherein the predefined behavior is a standard of hardware behavior of the processor;

determining whether the processor is secure during the target running process according to at least one of the output information and the final running state information of the checking device, when the checking device completes the task of the target running process.

2. The method of claim 1, wherein before determining whether the processor is secure during the target running process according to at least one of the output information and the final running state information of the checking device, the method further comprises:

at least one of the followings: recording data wrote to at least one of the peripheral and the memory by the processor, to obtain the output information of the processor during the target running process: and acquiring a final running state of the processor during the target running process through at least one of the software and the interface of the hardware at a termination of the target running process, to obtain the final running state information of the processor during the target running process:

the determining whether the processor is secure during the target running process according to at least one of the output information and the final running state information of the checking device further comprises:

at least one of the followings: comparing the output information of the checking device with the output information of the processor during the target running process to obtain a first comparison result, and comparing the final running state information of the checking device with the final running state information of the processor during the target running process to obtain a second comparison result;

determining whether the processor is secure during the target running process according to at least one of the first comparison result and the second comparison result.

3. The method of claim 2, wherein determining whether the processor is secure during the target running process according to at least one of the first comparison result and the second comparison result further comprises:

if determining whether the processor is secure during the target running process according to the first comparison result and the second comparison result:

determining that the processor is secure during the target running process, when the first comparison result indicates that the output information of the checking device is consistent with the output information of the processor during the target running process and the second comparison result indicates that the final running state information of the checking device is consistent with the final running state information of the processor during the target running process;

determining that the processor is not secure during the target running process, when the first comparison result indicates that the output information of the checking device is not consistent with the output information of the processor during the target running process or the second comparison result indicates that the final running state information of the checking device is not consistent with the final running state information of the processor during the target running process.

4. The method of claim 2, wherein the output information of the processor during the target running process and the output information of the checking device respectively comprise at least one of output data and output time; and wherein comparing the output information of the checking device with the output information of the processor during the target running process to obtain the first comparison result further comprising: comparing the output information of the checking device with the output information of the processor during the target running process to obtain the first comparison result, according to at least one of an order of the output data and contents of the output data.

5. The method of claim 1, wherein before determining whether the processor is secure during the target running process according to at least one of the output information and the final running state information of the checking device, the method further comprises:

determining whether at least one of the initial running state and the final running state of the processor during the target running process is legal, according to the predefined behavior.

6. The method of claim 1, wherein:

the initial running state information of the processor during the target running process is data stored in a memory corresponding to a set of feature states at the beginning of the target running process;

the final running state information of the processor during the target running process is data stored in a memory corresponding to a set of feature states at the termination of the target running process;

wherein the output information and a next running state of the processor during the target running process can be determined based on a current running state, the input information, and the set of feature states of the processor during the target running process.

7. The method of claim 6, wherein the memory comprises at least one of a registers and a cache.

8. The method of claim 6, wherein the processor is an instruction set processor, and the set of feature states is determined according to an instruction set of the processor.

9. The method of claim 1, wherein when causing the checking device to execute the task of the target running process in a manner conforming to the predefined behavior, the method further comprises:

stopping, by the checking device, executing the task and determining that the processor is not secure during the target running process, when the checking device fails to execute the task.

10. A checking device for determining security of a processor, comprising:

a tracing unit configured to acquire an initial running state of the processor during a target running process through at least one of software and an interface of hardware at a beginning of the target running process, to obtain initial running state information of the processor during the target running process, wherein, the target running process is a sub-process of a real-time running process of the processor; and record data read by the processor from a memory and at least one of a peripheral, an analog circuit inside the processor and a non-deterministic digital circuit inside the processor, to obtain the input information of the processor during the target running process;

a setting unit configured to set an initial running state of the checking device according to initial running state information of the processor during the target running process, and take the input information of the processor during the target running process as input information of the checking device;

a checking unit configured to execute a task of the target running process in a manner conforming to predefined behavior to obtain at least one of output information and final running state information of the checking unit, wherein the predefined behavior is a standard of hardware behavior of the processor;

a determining unit configured to determine whether the processor is secure during the target running process according to at least one of the output information and the final running state information of the checking unit when the checking unit completes the task of the target running process.

11. The checking device of claim 10, wherein the determining unit is further configured to perform at least one of:

comparing the output information of the checking unit with the output information of the processor during the target running process to obtain a first comparison result, and comparing the final running state information of the checking unit with the final running state information of the processor during the target running process to obtain a second comparison result; and determine whether the processor is secure during the target running process according to at least one of the first comparison result and the second comparison result.

12. The checking device of claim 11, wherein, the tracing unit is further configured to record data wrote to at least one of the peripheral and the memory by the processor, to obtain the output information of the processor during the target running process; and acquire a final running state of the processor during the target running process through at least one of software and the interface of hardware at a termination of the target running process, to obtain the final running state information of the processor during the target running process;

the determining unit is further configured to determine that the processor is secure during the target running process, when the first comparison result indicates that the output information of the checking unit is consistent with the output information of the processor during the target running process, and the second comparison result indicates that the final running state information of the processor during the checking unit is consistent with the final running state information of the target running process;

determine that the processor is not secure during the target running process, when the first comparison result indicates that the output information of the checking unit is not consistent with the output information of the processor during the target running process, or the second comparison result indicates that the final running state information of the checking unit is not consistent with the final running state information of the processor during the target running process.

13. The checking device of claim 11, wherein the output information of the processor during the target running process and the output information of the checking unit respectively comprise at least one of output data and output time; and wherein the determining unit is further configured to compare the output information of the checking unit with the output information of the processor during the target running process to obtain the first comparison result according to at least one of an order of the output data and contents of the output data.

14. The checking device of claim 10, wherein the determining unit is further configured to determine whether at least one of the initial running state and the final running state of the processor during the target running process is legal based on the predefined behavior.

15. The checking device of claim 10, wherein the initial running state information of the processor during the target running process is data stored in a memory corresponding to a set of feature states at the beginning of the target running process;

the final running state information of the processor during the target running process is data stored in a memory corresponding to a set of feature states at the termination of the target running process; and wherein the output information and a next running state of the processor during the target running process can be determined according to a current running state, the input information, and the set of feature states of the target running process.

16. The checking device of claim 15, wherein the memory comprises at least one of a register and a cache.

17. The checking device of claim 15, wherein the processor is an instruction set processor, and the set of feature states is determined according to an instruction set of the processor.

18. The checking device of claim 10, wherein the checking unit stops executing the task and determines that the processor is not secure during the target running process, when the checking unit fails to execute the task.

19. A checking system, comprising:

a checked processor, a memory, a peripheral, an input/output (TO) tracer and a checking processor; wherein:

the checked processor executes data inputting and outputting with at least one of the memory and the peripheral during the target running process;

the IO tracer records input information and output information between the checked processor and at least one of the memory and the peripheral during the target running process; and the checking processor acquires an initial running state of the checked processor during a target running process through at least one of software and an interface of hardware at a beginning of the target running process, to obtain initial running state information of the checked processor during the target running process, wherein, the target running process is a sub-process of a real-time running process of the checked processor; acquires data read by the checked processor from the memory and at least one of the peripheral, an analog circuit inside the checked processor and a non-deterministic digital circuit inside the checked processor, to obtain the input information of the checked processor during the target running process; takes the input information of the checked processor during the target running process as input information, and sets an initial running state of the checking processor according to the initial running state information of the checked processor during the target running process; executes a task of the target running process in a manner conforming to predefined behavior to obtain at least one of output information and final running state information of the checking processor, wherein the predefined behavior is a standard of hardware behavior of the processor; and determines whether the checked processor is secure during the target running process according to at least one of the output information and the final running state information of the checking processor when the checking processor completes the task of the target running process.

20. The checking system of claim 19, wherein the IO tracer further comprises a memory tracer and a peripheral tracer, wherein the memory tracer is configured to record the input information and the output information between the checked processor and the memory during the target running process, and the peripheral tracer is configured to record the input information and the output information between the checked processor and the peripheral during the target running process.

* * * * *